US010633258B2

(12) United States Patent
Rabaioli

(10) Patent No.: US 10,633,258 B2
(45) Date of Patent: Apr. 28, 2020

(54) PRECIPITATED ALUMINA AND METHOD OF PREPARATION

(71) Applicant: Sasol Performance Chemicals GmbH, Hamburg (DE)

(72) Inventor: Maria Roberta Rabaioli, Westlake, LA (US)

(73) Assignee: Sasol Performance Chemicals GmbH, Hamburg (DE)

( * ) Notice: Subject to any disclaimer, the term of this patent is extended or adjusted under 35 U.S.C. 154(b) by 344 days.

(21) Appl. No.: 15/329,949

(22) PCT Filed: Aug. 5, 2015

(86) PCT No.: PCT/US2015/043842
§ 371 (c)(1),
(2) Date: Jan. 27, 2017

(87) PCT Pub. No.: WO2016/022709
PCT Pub. Date: Feb. 11, 2016

(65) Prior Publication Data
US 2018/0208478 A1 Jul. 26, 2018

Related U.S. Application Data

(60) Provisional application No. 62/034,855, filed on Aug. 8, 2014.

(51) Int. Cl.
*C01B 17/66* (2006.01)
*C01F 7/34* (2006.01)
*C01F 7/14* (2006.01)

(52) U.S. Cl.
CPC ............ *C01F 7/34* (2013.01); *C01F 7/14* (2013.01); *C01F 7/141* (2013.01);
(Continued)

(58) Field of Classification Search
CPC .... C01F 7/34; C01F 7/14; C01F 7/141; C01P 2006/11; C01P 2002/76; C01P 2002/54;
(Continued)

(56) References Cited

U.S. PATENT DOCUMENTS

| 4,154,812 A | 5/1979 | Sanchez et al. |
| 4,248,852 A | 2/1981 | Wakabayashi et al. |

(Continued)

FOREIGN PATENT DOCUMENTS

| GB | 1603461 | 11/1981 |
| JP | 2000191321 | 7/2000 |

OTHER PUBLICATIONS

Machine Translation using J-Plat Pat of JP 2000-191321A (Year: 2000).*

(Continued)

*Primary Examiner* — Haytham Soliman
(74) *Attorney, Agent, or Firm* — Bushman Werner, P.C.

(57) ABSTRACT

A process for producing alumina, the process having a seeding phase and a precipitation phase. During the seeding phase a seed mixture is produced by adding an aluminium salt to an aqueous solution and then adding an alkaline metal aluminate to the mixture while maintaining the seed mixture at generally neutral pH. The precipitation phase produces precipitated alumina by simultaneously adding aluminium salt and alkaline metal aluminate to the seed mixture while maintaining a pH from 6.9 to 7.8. The recovered precipitated alumina has at least one, preferably all the following characteristics: i) a crystallite size of 33-42 Ang.: in the (120) diagonal plane (using XRD); ii) a crystallite d-spacing (020) of between 6.30-6.59 Ang.; iii) a high porosity with an average pore diameter of 115-166 Ang.; iv) a relatively low bulk density of 250-350 kg/m$^3$; v) a surface area after calcination for 24 hours at 1100° C. of 60-80 m$^2$/g; and vi) a pore volume after calcination for one hour at 1000° C. 0.8-1.1 m$^3$/g.

11 Claims, 1 Drawing Sheet

(52) U.S. Cl.
CPC ...... *C01P 2002/52* (2013.01); *C01P 2002/54* (2013.01); *C01P 2002/60* (2013.01); *C01P 2002/72* (2013.01); *C01P 2002/76* (2013.01); *C01P 2006/10* (2013.01); *C01P 2006/11* (2013.01); *C01P 2006/12* (2013.01); *C01P 2006/13* (2013.01); *C01P 2006/14* (2013.01); *C01P 2006/16* (2013.01); *C01P 2006/60* (2013.01); *C01P 2006/80* (2013.01)

(58) Field of Classification Search
CPC .............. C01P 2006/16; C01P 2006/14; C01P 2006/60; C01P 2006/12; C01P 2006/10; C01P 2002/72; C01P 2002/60; C01P 2002/52; C01P 2006/80; C01P 2006/13
USPC ........................................................ 423/265
See application file for complete search history.

(56) References Cited

U.S. PATENT DOCUMENTS

| | | | |
|---|---|---|---|
| 6,174,511 B1 * | 1/2001 | Tsukada | B01J 21/04 |
| | | | 423/628 |
| 2009/0023581 A1 | 1/2009 | Di Monte et al. | |
| 2012/0046163 A1 * | 2/2012 | Ifrah | B01J 23/002 |
| | | | 502/241 |

OTHER PUBLICATIONS

Machine Translation using Espacenet of JP 2000-191321A (Year: 2000).*

* cited by examiner

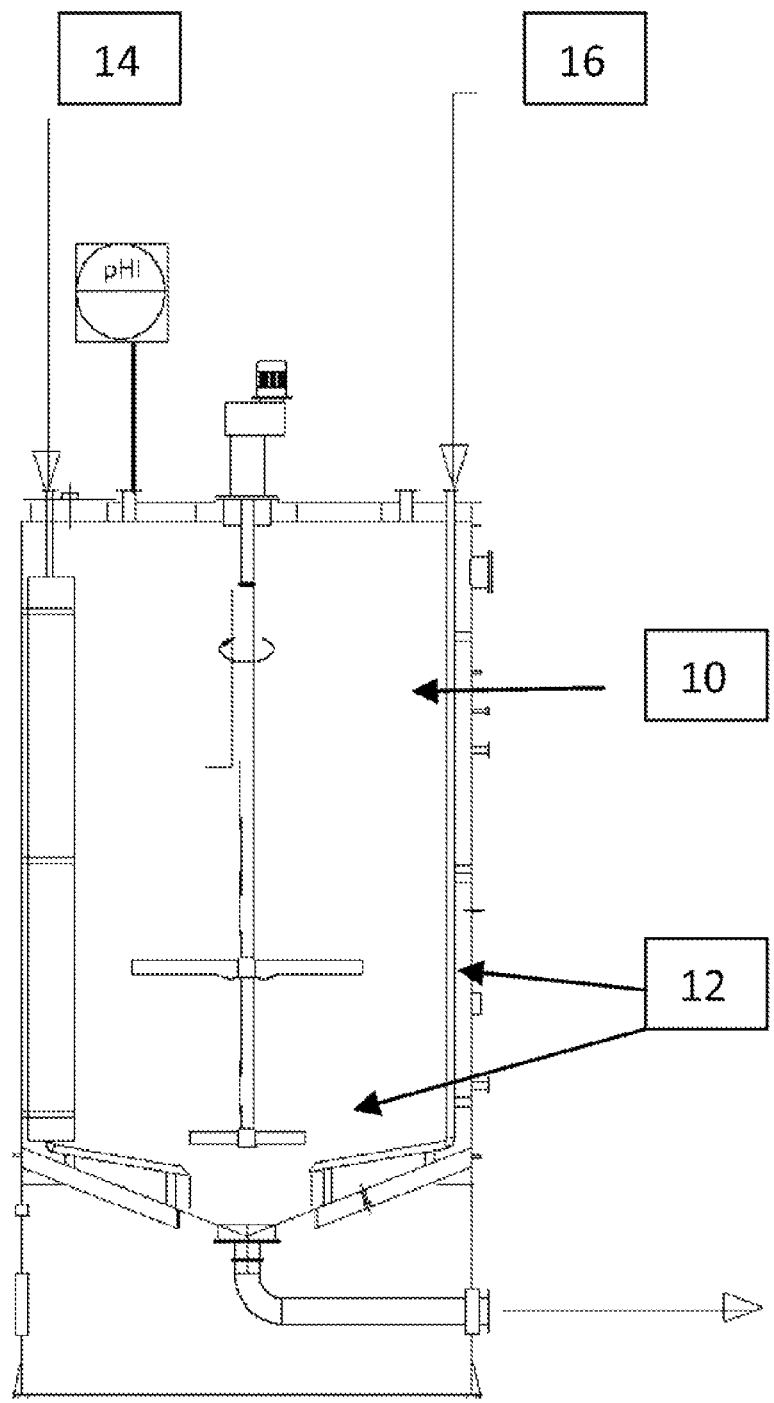

PRECIPITATED ALUMINA AND METHOD OF PREPARATION

CROSS-REFERENCE TO RELATED APPLICATION

This application is a U.S. National Phase of PCT/US2015/043842, filed Aug. 5, 2015, which claims priority to U.S. Application No. 62/034,855 filed on Aug. 8, 2014, the disclosures of which are incorporated herein by reference for all purposes.

FIELD OF THE INVENTION

The present invention is directed to a process for producing alumina. In particular, the present invention is directed at a process for producing highly porous crystalline, semi-boehmite alumina with superior thermal stability and high surface area at elevated temperatures.

BACKGROUND OF THE INVENTION

The preparation of alumina through a precipitation process is taught in U.S. Pat. Nos. 4,154,812; 6,174,511; and 4,248,852, all of which are hereby incorporated by reference for all purposes.

U.S. Pat. No. 4,154,812 teaches a process whereby a highly diluted mixture of seeds is prepared by adding an initial charge of aluminum sulfate solution to a heel of water in an amount sufficient to adjust the pH to a value from about 2 to a value of about 5. For this material the acidity of the seed solution is an important property. The aluminium sulfate hydrolyses and forms very small crystallites of boehmite. The nucleation process of the seeds takes place very rapidly. Subsequently, the mixture is neutralized by simultaneously adding a solution of sodium aluminate and a solution of aluminum sulfate. The control of the pH, the temperature, the reactants, and the feed rates are strictly controlled during the precipitation strike. Then the slurry is aged. After filtration and washing the slurry is finally dried.

The present invention teaches a more efficient process which has a beneficial effect on the pore volume. Specifically, the process of the present invention produces a unique, highly porous, crystalline, semi-boehmite powder with superior thermal stability and high surface area at elevated calcining temperatures.

SUMMARY OF THE INVENTION

In one aspect, the present invention provides a process for producing alumina comprising the following steps:
i) preparing an aluminum mixture by adding an aluminum salt to an aqueous solution; the aluminum mixture having a pH of 3.0 to 4.0.
ii) adding an alkaline metal aluminate to the aluminum mixture to form a seed mixture, wherein the addition of the alkaline metal aluminate to the aluminum mixture occurs at a rate to maintain the pH of the seed mixture from about 6.0 to about 7.5;
iii) aging the seed mixture;
iv) adding to the seed mixture additional aluminum salt and alkaline metal aluminate, said addition being at a rate to produce a precipitated mixture comprising a precipitated alumina and to maintain the pH of the precipitated mixture from about 6.9 to about 7.8;
v) heating the precipitated mixture comprising the precipitated alumina whilst increasing the pH of the precipitated mixture to from a pH of 8.8 to a pH of 9.3; and
vi) recovering the precipitated alumina.

The process of the present invention therefore occurs in two phases: a seeding phase and a precipitation phase.

The aluminum salt added in step i) and step iv) of the process of the invention may be aluminum sulfate, aluminum chloride, or aluminum nitrate, preferably aluminum sulphate. The aluminium sulphate may have a concentration of $Al_2O_3$ of from about 7 wt % to about 8 wt %. The process of the invention may include an initial step of heating the alumina salt before it is added to the aqueous solution, preferably water in step i of the process of the invention to a temperature of from about 45° C. to about 75° C. The aqueous solution or water to which the aluminum salt is added in step i of the process may be heated to between 68° C. to 78° C. before the addition of the aluminum salt occurs. The alumina salt added in step iv may be added in the form of an aluminum mixture comprising the aluminum salt and an aqueous solution, preferably water.

The alkaline metal aluminate may be sodium aluminate, or potassium aluminate, preferably sodium aluminate. The sodium aluminate may have a concentration of $Al_2O_3$ of from about 20 wt % to about 23 wt % and of $Na_2O$ of from about 17 wt % to about 21 wt %. The alkaline metal aluminate may be heated to a temperature of from about 45° C. to about 75° C. before it is added to the aluminum mixture in step ii of the process of the invention.

The pH of the seed mixture in step ii of the invention is maintained near neutral, in a range of from a pH of 6.0 to a pH of 7.5, preferably from a pH of 6.5 to a pH of 7.0.

The seed mixture may be aged for 5 to 20 minutes at a temperature from 68° C. to 78° C. The seed mixture is preferably aged for 10 minutes at a temperature of 70° C.

The combination of low particle concentration and neutral pH produces very small crystallites of boehmite gel. The seeds are discrete particulates that, after drying, have a very high porosity.

In the precipitation phase, step iv of the process of the invention, an aluminum salt and the alkaline metal aluminate are added to the seed mixture. It is preferable that the aluminum salt and the alkaline metal aluminate are added simultaneously to the seed mixture in step iv of the process of the invention.

Step iv of the process of the invention may be performed at temperatures of from 68° C. to 78° C. The pH of the mixture in step iv may be from a pH of 6.9 to 7.8, preferably 7.2 to 7.5. The feed rate of the additional aluminum salt and alkaline metal aluminate can be varied to control the characteristics of the resulting alumina but in general the precipitation takes place over a time ranging from 20 to 70 minutes.

The precipitated mixture may be heated to a temperature of from 85° C. to 90° C. and the pH increased to a range of from 8.8 to 9.3. The pH is increased with the addition of an alkaline metal aluminate.

The precipitated alumina may then be recovered by washing and then spray drying. These are known processes in the field of the invention.

The process may include the further step of doping the precipitated alumina with an $La_2O_3$ precursor, such as a lanthanum salt, for example lanthanum acetate. Preferably the precipitated alumina is doped with about 3% wt $La_2O_3$.

A unique aspect of the present invention is that the pH of both the seed mixture and the precipitated mixture is maintained near neutral at about 6.0-7.8. This is distinct from prior art processes where the seed mixture has an acidic pH range of from 2 to 5.

In another aspect, the present invention provides an alumina composition. The alumina is produced by the process of the present invention and has at least one, preferably all, of the following characteristics:

a crystallite size of 33-42 Ang. in the (120) diagonal plane (using XRD);

a crystallite d-spacing (020) of between 6.30-6.59 Ang.; a high porosity with an average pore diameter of 115-166 Ang.;

a relatively low bulk density of 250-350 kg/m$^3$;

a surface area after calcination for 24 hours at 1100° C. of 60-80 m$^2$/g; and a pore volume after calcination for one hour at 1000° C. 0.8-1.1 m$^3$/g.

These and further features and advantages of the present invention will become apparent from the following detailed description, wherein reference is made to the FIGURE in the accompanying drawings.

BRIEF DESCRIPTION OF THE DRAWINGS

FIG. 1 illustrates the reaction vessel in which the process of the present invention takes place.

DETAILED DESCRIPTION OF PREFERRED EMBODIMENTS

The process of the present invention occurs in two phases: a seeding phase and a precipitation phase. In the seeding phase, an aluminum mixture is first prepared by adding a desired amount of a suitable aluminum salt, e.g., aluminum sulfate, aluminum chloride, aluminum nitrate, etc., heated to a temperature of from about 45° C. to about 75° C., to a desired amount of an aqueous solution, for example water heated to between 68° C. to 78° C. This is followed by the metered addition of an appropriate alkaline metal aluminate, e.g., sodium aluminate, potassium aluminate, etc., heated to a temperature of from about 45° C. to about 75° C. The addition of the alkaline metal aluminate to the aluminum mixture forms the seed mixture. The pH of the seed mixture is maintained near neutral, in a range of from about 6.0 to 7.5, preferably from about 6.5 to about 7.0. The seed mixture is then aged for about 5 to about 20 minutes at a temperature from about 68° C. to about 78° C. The combination of low particle concentration and neutral pH produces very small crystallites of boehmite gel. The seeds are discrete particulates that, after drying, have a very high porosity.

In the precipitation phase, additional amounts of the aluminum salt and the alkaline metal aluminate are simultaneously added to the seed mixture to form a precipitated mixture comprising precipitated alumina. The precipitated alumina is formed at temperatures of from about 68° C. to about 78° C. and from a pH of about 6.9 to about 7.8, preferably about 7.2 to about 7.5. The feed rate of the additional aluminum salt and alkaline metal aluminate can be varied to control the characteristics of the resulting alumina but in general the precipitation takes place over a time ranging from about 20 to about 70 minutes. To produce alumina with agglomerated more porous crystals, the feed rate can be increased, thereby reducing the precipitation time. The precipitated mixture is heated to a temperature of from about 85° C. to about 90° C. and the pH increased to a range of from about 8.8 to about 9.3.

Following this, the precipitated alumina is washed and spray dried.

A unique aspect of the present invention is that the pH of both the seed mixture and the precipitated mixture is maintained near neutral at 6.0-7.8. This is distinct from prior art processes which conduct the seeding phase at an acidic pH range of from 2 to 5.

In a preferred embodiment, the aluminium salt is aluminium sulphate having a concentration of $Al_2O_3$ of from about 7 wt % to about 8 wt %. The alkaline metal aluminate is preferably sodium aluminate having a concentration of $Al_2O_3$ of from about 20 wt % to about 23 wt % and of $Na_2O$ of from about 17 wt % to about 21 wt %. The seed mixture is preferably aged for about 10 minutes at a temperature of 70° C.

As shown in FIG. 1 below, the process takes place in a vessel (10) equipped with a mechanical stirrer (12) with adjustable revolution rates. The reactants are added through two suitable internal distributors or pipelines (14) and (16). The pipelines (14) and (16) deposit the reagents in close proximity to the stirrer (12). The vessel (10) can be connected to an external recycling system (not shown) which homogenizes the slurry. By using a vessel (10) such as this, the feeding rates of the reagents can be carefully controlled to provide a steady pH while minimizing the precipitation time.

In another embodiment, the resulting alumina may be doped with about 3% wt $La_2O_3$ based on the composite by adding a lanthanum salt such as lanthanum acetate. As will be shown hereafter, the process of the present invention produces alumina with at least one of the following characteristics:

(a) a crystallite size of 33-42 Å. in the (120) diagonal plane (using XRD);
(b) a crystallite d-spacing (020) of between 6.30-6.59 Ang. preferably 6.44-6.48 Ang.;
(c) a high porosity with an average pore diameter of 115-166 Ang.;
(d) a relatively low bulk density of 250-350 kg/m$^3$;
(e) a surface area after calcination for 24 hours at 1100° C. of 60-80 m$^2$/g; and
(f) a pore volume after calcination for one hour at 1000° C. 0.8-1.1 m$^3$/g.

The following non-limiting examples will further demonstrate the invention.

Measurement Methods:

The inherent properties of the product were measured by the following analytical techniques. In order to determine the Loose Bulk Density (Kg/m$^3$), 50 g of sample were shaken in a 250 ml plastic bottle per one minute. Afterwards the powder was poured in about 15 seconds, through a funnel, into 100 mL graduated cylinder. After 3 minutes the volume of the powder in the cylinder was measured and the density calculated from the weight gain of the graduated cylinder containing the alumina to the volume of the powder in the cylinder.

The method used to determine the amount of total volatile was based on gravimetric determination. An exactly weighted sample ($W_i$) was heated to 1200° C. at a defined heating rate in a crucible and temperature was maintained for 1 hour where the constant weight was reached. The sample was slowly cooled to room temperature. On completion of the measurement, the total volatile moisture content in percent by weight were calculated from the originally weighted quantity, $W_i$, and the final weighted quantity, $W_f$, using the formula:

$$\text{Total volatile \%}=100*(W_i-W_f)/W_i.$$

To determine the crystallite size (Å), samples of powder were exposed to X-rays. The diffraction angles, intensity and the half-value width of the reflections (120), from about 24° to about 32° 2θ angle, and (020), from about 11° and about 18° 2θ angle, were used to determine the average size of the crystallites using the Scherrer equation:

Crystallite Size=$K·\lambda/(\beta \cos(\theta))$ where K is particle shape factor (0.94), constant for powders, λ is the wavelength of X-rays (1.5406), β=width of half maximum intensity.

The exact location of the reflection peaks (2θ) and the width of half maximum intensity of the corresponding reflection were determined with a software that used these data to calculate the crystallite sizes. The surface area (A) in m²/g and the pore volume were measured by nitrogen adsorption at the temperature of liquid nitrogen, knowing the adsorption isotherm within a defined range of relative pressures, p/p$_0$ (p$_0$ is the vapour pressure of liquid nitrogen and p is the pressure of the adsorbing nitrogen in gas phase). Data was collected on heat treated samples at 550° C. for 3 hours in static oven and, on calcined products, after thermal treatment in static oven at 1000° C. for 1 hour and 1100° C. for 24 hours. The surface area was calculated using the method of Brunauer-Emmett-Teller, known as B.E.T. The pore volume (V) in cc/g was measured in correspondence of p/p$_0$ equal to 0.99. The Average pore diameter in Å was determined from the surface area and the pore volume values using the formula: 4*V/A*10,000. The distribution of the pore diameters was determined from the desorption isotherm using the BJH method (Barrett-Joyner-Alenda) according to the literature. Before each analysis, the samples were degassed for 30 minutes at 300° C. in nitrogen flow to remove traces of humidity eventually adsorbed during sample handling.

Sodium content was obtained by means of AAS analysis (Atomic Absorption Spectroscopy). The sulphate content, SO$_4$, was determined by using EDXRF analysis (Energy Dispersive X-ray Fluorescence). Before measurements, the adsorption of humidity must be controlled. A small amount of sample, about 5 gr of filter cake or powder, was weighted in a ceramic crucible, placed into the static oven and heated it up to 800° C. with ramp of 10° C./min and thermally treated at 800° C. for 30 minutes. After dehydration, the sample was allowed to cool in container in presence of P$_2$O$_5$ as drying agent. The samples were pressed in the sample holder according to the prescription of the instrument manufacturer, the sulphur amount, expressed as SO$_4$, was measured through calibration curve.

The agglomerate size of the precipitated alumina powder was measured through laser diffraction method. Depending on the particle size, different diffraction angles are obtained, with small particles diffracting the light more than large particles. For measurement, the sample was dispersed in isopropanol and circulated through the measuring system. Assuming spherically shaped particles, the particle size distribution was calculated from the resultant, angle-dependent intensity distribution, the value at 50% of the distribution was reported for then agglomerate size.

Example 1

In the seeding phase, an aluminum mixture of an aluminium sulphate and an aqueous solution, in this case water having a concentration of equivalent Al$_2$O$_3$ of 7.5% wt. was heated to a temperature of 68° C. A solution of sodium aluminate in an aqueous solution in this case water with 20% wt Al$_2$O$_3$ and 17.7% wt Na$_2$O, was also heated to a temperature of 68° C. A heel of 30 m of water was fed into a vessel as per FIG. 1 and heated to about 70° C. by direct steam injection. 70 L of the heated aluminium mixture (aluminum sulfate solution) was added to the heel, immediately after 40 L of the heated sodium aluminate was metered in order to obtain a seed mixture having a pH of 6.0-6.5. The concentration of equivalent Al$_2$O$_3$ in the mixture was 0.06% wt. The mixture was aged at 70° C. for 10 minutes.

In the precipitation phase, step iv of the process of the invention, the aluminium sulfate and the sodium aluminate solutions prepared for the seeding phase were then simultaneously added. The aluminium sulfate was metered at constant feed rate of 12 m³/h, while the sodium aluminate solution feed rate was regulated in such a manner that the pH was maintained in the range of 7.1-7.3. The precipitation phase were carried out for 70 minutes and at temperatures in the range of 73-75° C. At the end the precipitated mixture contained a concentration of equivalent Al$_2$O$_3$ of 6-6.5% wt.

The precipitated mixture was heated to about 85-90° C. and subjected to a change of pH to about 9.2 by the addition of an alkaline metal aluminate. The pH was stabilized and the precipitated mixture was filtered and washed with water on a belt filter in order to remove the Na$_2$SO$_4$ salt. The filter cake from the filter belt was collected in a tank and diluted with water to obtain a slurry containing 18% wt solids suitable to be pumped to a spray dryer. After spray drying, the final alumina powder or precipitate had the following characteristics:

| | |
|---|---|
| LBD Kg/m³ | 350 |
| Wt % Na | 0.013 |
| Wt % SO$_4$ | 0.11 |
| N$_2$ Surface Area at 550° C./3 hours, m²/g | 283 |
| N$_2$ Pore Volume at 550° C./3 hours, cm³g | 0.88 |

Example 2

The method of Example 1 was followed with the exception that the aluminium sulphate solution was heated to a temperature of 63° C. and the solution of sodium aluminate was heated to a temperature of 55° C. The precipitation time was 55 minutes and the final concentration of Al$_2$O$_3$ was 6%. The properties of the alumina powder or precipitate were equivalent to those of the Example 1:

| | |
|---|---|
| LBD Kg/m³ | 350 |
| Crystallite Size (XRD), Å | 40-42 |
| Boehmite 020 d-spacing, Å | 6.34 |
| Wt % Na | 0.012 |
| Wt % SO$_4$ | 0.09 |
| Wt % Total Volatile | 26.30 |
| N$_2$ Surface Area at 550° C./3 hours, m²/g | 277 |
| N$_2$ Pore Volume at 550° C./3 hours, cm³g | 0.86 |

Example 3

This example describes a production of precipitated alumina with higher porosity than that achieved by the method of Example 1.

A vessel having a volume of 70 m³ was equipped with turbine type large impellers mixers running at a speed giving a large circulating capacity and a recycling fluid system provided by an external pipeline and a circulating pump. In the seeding phase, the aluminium sulfate solution was heated to 63° C. and the solution of sodium aluminate was heated to 55° C. A heel of 30 m³ of water was heated to 70° C. About 70 L of the heated aluminium sulfate solution was added to the heel. Immediately after 33 L of heated sodium aluminate was metered in order to obtain a mixture at pH 6.8. The mixture was aged at 70° C. for 10 minutes.

The aluminium sulfate solution was introduced at about 25 m³/h, on average the sodium aluminate feed rate was about 15 m³/h, the pH was maintained in the range of 7.2-7.7. The precipitation phase was carried out at a temperature of 73-76° C. on average. The precipitation was complete in 22-25 minutes. The precipitated mixture contained an amount of precipitated alumina equivalent to about 4.7% wt $Al_2O_3$.

The precipitated mixture was then heated to about 90° C. and the pH adjusted to 8.8-9.2 by the addition of an alkaline metal aluminate. The filtration capability of the precipitated mixture was reached and maintained without problems. The slurry-to-water ratio was 2.5-3 by volume. The filter cake from the filter belt was collected in a tank and diluted with water up to obtain an amount of solids of 16% wt. and the slurry was dried with a spray dryer.

| | |
|---|---|
| LBD Kg/m³ | 320 |
| Crystallite Size (XRD), Å | 33 |
| Boehmite 020 d-spacing, Å | 6.46 |
| Wt % Na | 0.012 |
| Wt % $SO_4$ | 0.11 |
| Wt % Total Volatile | 26.0 |
| $N_2$ Surface Area at 550° C./3 hours, m²/g | 334 |
| $N_2$ Pore Volume at 550° C./3 hours, cm³g | 1.03 |

Example 4

This example describes a production of precipitated alumina having a higher porosity than that achieved following the method of Example 3.

In the seeding phase, an aluminium sulfate solution was heated to a temperature of 63° C. and a solution of sodium aluminate was heated to a temperature of 55° C. A heel of 30 m³ of water was fed into a reactor tank and heated to about 68° C. The seeds were prepared at pH 6.5. The mixture was aged at 70° C. for 10 minutes. The amount of seeds was 0.07% wt.

The precipitation phase was completed in 42 minutes at 75° C. with aluminium sulfate feeding rate of 6.1 m3/h by metering the aluminate solution to maintain the pH at 7.5. The slurry contained an amount of precipitated alumina equivalent to 3.7% wt $Al_2O_3$ basis. The slurry was heated to 90° C. and subjected to a change of pH close to 9.0 by the addition of an alkaline metal aluminate. The filtration capability of the slurry was maintained without problems. The powder properties are shown below:

| | |
|---|---|
| LBD Kg/m³ | 270 |
| Crystallite Size (XRD), Å | 37 |
| Wt % Na | 0.03 |
| Wt % $SO_4$ | 0.14 |
| Wt % Total Volatile | 28.0 |
| $N_2$ Surface Area at 550° C./3 hours, m²/g | 314 |
| $N_2$ Pore Volume at 550° C./3 hours, cm³g | 1.3 |

Example 5

The example describes the preparation of a stabilized alumina using the method of Example 2. The filter cake produced according to Example 2, was doped with 3% wt $La_2O_3$ on the basis on 100% wt of the composite by adding a solution of lanthanum acetate. The dried powder was calcined at 1000° C., 1100° C., and 1200° C. for 24 hours. After calcination, the powder had the following characteristics:

| | $N_2$ Surface Area m²/g |
|---|---|
| 1000° C./24 hours | 124 |
| 1100° C./24 hours | 81 |
| 1200° C./24 hours | 46 |

Example 6

The filter cake produced according to the Example 3, was doped with 3% wt $La_2O_3$ on the basis on 100% wt of the composite by adding a solution of lanthanum acetate. The dried powder after calcinations at temperatures of 1000° C., 1100° C., and 1200° C. for 24 hours had the following characteristics:

| | $N_2$ Surface Area m²/g |
|---|---|
| 1000° C./24 hours | 143 |
| 1100° C./24 hours | 105 |
| 1200° C./24 hours | 55 |

Comparative Example 1

The process according to U.S. Pat. No. 4,154,812 was performed as follows. An aluminium sulphate solution with 7.0% wt. of $Al_2O_3$ and a solution of sodium aluminate with 20% $Al_2O_3$ were heated to a temperature of about 68° C. A heel of 35 m³ of water was fed into a reactor tank and heated to 72° C. The heel was acidified with a sufficient amount of aluminium sulfate metered to reach a stable pH of 3.5 (required 90 L of solution) and the pH was stabilized. The mixture was aged for 5 minutes. The reactants solutions were added and the flow rates adjusted to maintain the pH of about 7.3. The precipitation time was 55 minutes. At the end of the precipitation phase the slurry concentration was 6% wt $Al_2O_3$ basis. After 55 minutes the alumina slurry was heated to a temperature of about 90° C. and subjected to a change of pH close to the isoelectric point. The product filterability and washing capability of the product was very difficult. The product had the following characteristics on the filter cake after drying and calcining in a static oven at 100° C.:

| | |
|---|---|
| Crystallite Size (XRD), Å | 50 |
| $N_2$ Surface Area at 550° C./3 hours, cm³g | 341 |
| $N_2$ Pore Volume at 550° C./3 hours, cm³g | 0.68 |

Comparative Example 2

The process according to U.S. Pat. No. 4,154,812 was performed as follows. The heel was acidified at pH 3.5 by adding aluminium sulfate. The mixture was aged for about 9 minutes. The precipitation was completed in 50 minutes at a temperature of 72-73° C. At the end of precipitation phase the slurry contained an amount of precipitated alumina equivalent to 6% wt as Al2O3. Sodium aluminate was added to adjust the pH to a value close to 9.2. The slurry was not heated. The filterability and washing capability of the product was extremely difficult. The filter cake after drying and calcining showed the following characteristics:

| | |
|---|---|
| N$_2$ Surface Area at 550° C./3 hours, cm$^3$g | 266 |
| N$_2$ Pore Volume at 550° C./3 hours, cm$^3$g | 0.71 |

Comparative Example 3

The process according to U.S. Pat. No. 4,154,812 was performed as follows. The trial was carried out in the conditions of Comparative Example 2, but the feeding rate was slowed down making the precipitation time 170 minutes. The product characteristics are shown in the table:

| | |
|---|---|
| N$_2$ Surface Area at 550° C./3 hours, cm$^3$g | 295 |
| N$_2$ Pore Volume at 550° C./3 hours, cm$^3$g | 0.75 |

It will be apparent from the above examples that the process of the present invention has several advantages over the prior art processes. For example, the seeding mechanism and relatively high initial pH range accelerate the precipitation process time. This short precipitation time renders very small crystallites of 33-42 Å using the present process as compared to 50-60 Å using the prior art processes, leading to higher porosities and a lower bulk density which correlates well in achieving higher surface areas and good pore volumes. The filtration efficiency produces higher purity aluminas with lower ppm levels of sodium and sulfate contamination. Finally, the higher solids content in the slurry before spray drying saves energy. The process of the present invention produces alumina having the following properties compared to those of the prior art:

| | Units | Product as per U.S. Pat. No. 4,154,812 | Commercially Available Alumina | Present Invention |
|---|---|---|---|---|
| Bulk density | Kg/m3 | 385 | 224 | 320 |
| Total volatile % (LOI at 1200° C./1 h) | % | 27.5-29.6 | | 26 |
| Agglomerate Size | μm | 21.5 | | 66.3 |
| Crystallite size (020) | Å | 45-51 | | 28-31 |
| Crystallite size (120) | Å. | 48-51 | 41-46 | 33-42 |
| Crystalline d spacing (020) | Å. | 6.37 | | 6.46 |
| Low level Impurities | | | | |
| Na2O, ppm | Ppm | 590 | <400 | 156 |
| SO4, ppm | Ppm | 3100 | | 900 |
| | | 399° C./1 hours | 600° C. | 550° C./3 hours |
| Surface Area | m2/g | 413 | 320 | 334 |
| Pore Volume | cc/g | 0.77 | | 1.03 |
| Average Pore Radius (Diameter) | Ang. | 37 (74) | | 62 (123) |
| BJH Pore Diameter | Å | Not available | | 80 |
| CALCINED PRODUCTS | | 1100° C./24 hour | 1100° C./24 hour | 1100° C./24 hour |
| Surface Area | m2/g | | 30 | 72, 75 |
| | | 1000° C./1 hour | 1000° C./1 hour | 1000° C./1 hour |
| | | 135 | 155 | 150 |
| | | 1000° C./1 hour | 1000° C./1 hour | 1000° C./1 hour |
| Pore Volume | Cc/g | 0.7 | | >0.7 |

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A process for producing alumina, comprising the following steps:
   i) preparing an alumina mixture by adding an aluminum salt to an aqueous solution; the alumina mixture having a pH of 3 to 4;
   ii) adding an alkaline metal aluminate to the alumina mixture to form a seed mixture, wherein the addition of the alkaline metal aluminate occurs at a rate to maintain the pH of the seed mixture from 6.0 to 7.5;
   iii) aging the seed mixture;
   iv) adding to the seed mixture additional aluminum salt and additional alkaline metal aluminate, said addition being at a rate to produce a precipitated mixture comprising a precipitated alumina and to maintain the pH of the precipitated mixture from 6.9 to 7.8;
   v) heating the precipitated mixture comprising the precipitated alumina whilst increasing the pH from a pH of 8.8 to a pH of 9.3; and
   vi) recovering the precipitated alumina.

2. The process of claim 1 wherein the aluminum salt added in step i) and step iv) of the process comprises aluminum sulfate, aluminum chloride, or aluminum nitrate.

3. The process of claim 1 wherein the aqueous solution is water.

4. The process of claim 1, wherein the alkaline metal aluminate added in step ii) and step iv) of the process comprises sodium aluminate or potassium aluminate.

5. The process of claim 1; wherein the pH of the seed mixture of step ii) of the process is from 6.5 to 7.0.

6. The process of claim 1, wherein aging of the seed mixture comprises heating the mixture from 68° C. to 78° C. for 5 to 20 minutes.

7. The process of claim 1, wherein the aluminum salt and alkaline metal aluminate are added simultaneously in step iv) of the process.

8. The process of claim 1, wherein the pH of the precipitated mixture of step iv) of the process is from 7.2 to 7.5.

9. The process of claim 1, wherein step iv) takes place over a time ranging from 20 minutes to 70 minutes.

10. The process of claim 1 including the further step of doping the precipitated alumina with an $La_2O_3$ precursor.

11. A composition of alumina produced by the process of claim 1, comprising all of the following characteristics:
   i) a crystallite size of 33-42 Ang. in the (120) diagonal plane (using XRD);
   ii) a crystallite d-spacing (020) of between 6.30-6.59 Ang.;
   iii) a high porosity with an average pore diameter of 115-166 Ang.;
   iv) a relatively low bulk density of 250-350 $kg/m^3$;
   v) a surface area after calcination for 24 hours at 1100° C. of 60-80 $m^2/g$; and
   vi) a pore volume after calcination for one hour at 1000° C. 0.8-1.1 $m^3/g$.

* * * * *

UNITED STATES PATENT AND TRADEMARK OFFICE
CERTIFICATE OF CORRECTION

PATENT NO. : 10,633,258 B2
APPLICATION NO. : 15/329949
DATED : April 28, 2020
INVENTOR(S) : Maria Roberta Rabaioli It is certified that error appears in the above-identified patent and that said Letters Patent is hereby corrected as shown below:

On the Title Page

In the last line of the Abstract, please replace "0.8-1.1 $m^3/g$" with --0.8-1.1 $cm^3/g$--.

In the Specification

At Column 3, Line 18, please replace "0.8-1.1 $m^3/g$" with --0.8-1.1 $cm^3/g$--.

At Column 4, Line 41, please replace "0.8-1.1 $m^3/g$" with --0.8-1.1 $cm^3/g$--.

At Column 12, Line 17, please replace "0.8-1.1 $m^3/g$" with --0.8-1.1 $cm^3/g$--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*